(No Model.)
W. H. SNOW.
DEVICE FOR CURING TOBACCO.
No. 322,330. Patented July 14, 1885.
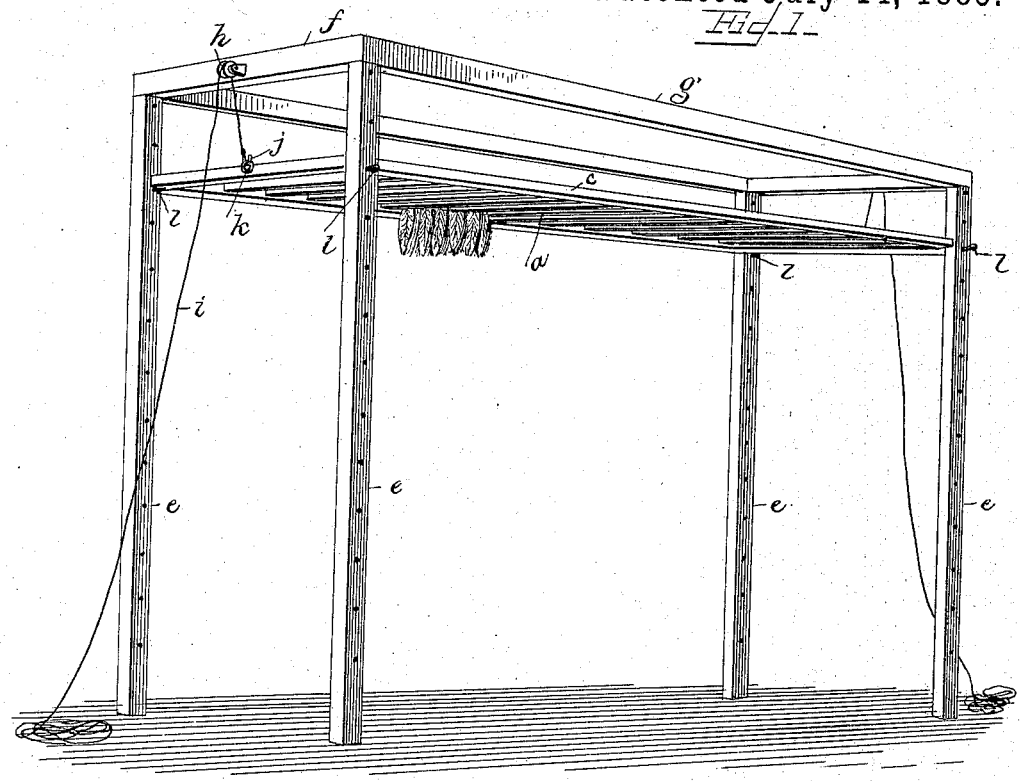
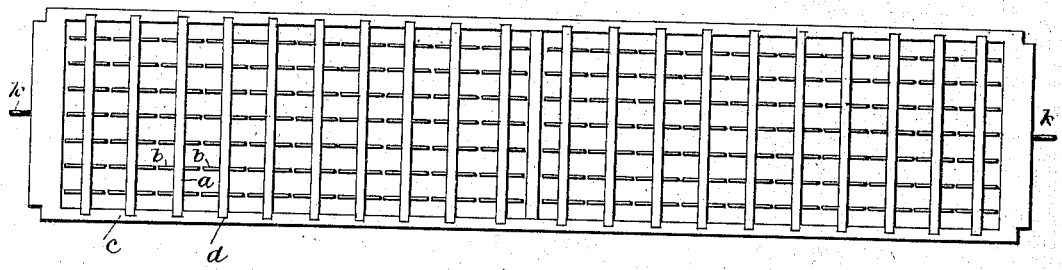
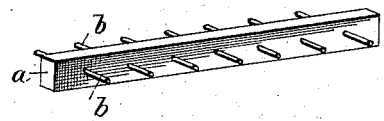
WITNESSES
F. L. Durand
E. A. Finckel
INVENTOR
William H. Snow,
by Wm H. Finckel
his Attorney.

United States Patent Office.

WILLIAM HENRY SNOW, OF HIGH POINT, NORTH CAROLINA.

DEVICE FOR CURING TOBACCO.

SPECIFICATION forming part of Letters Patent No. 322,330, dated July 14, 1885

Application filed March 27, 1885. (No model.)

*To all whom it may concern:*

Be it known that I, WILLIAM HENRY SNOW, a citizen of the United States, residing at High Point, in the county of Guilford and State of North Carolina, have invented certain new and useful Improvements in Curing Tobacco, of which the following is a full, clear, and exact description.

The object of this invention is to cure tobacco in an economical manner both as to the plant itself and in the barn or drying-house.

In the common mode of curing tobacco the plants are cut down when the central leaves are ripe, and the stalk split longitudinally and straddled on a lath or stick and so hung up in the barn. By this mode the lower leaves, which ripen first, rot or waste in the field, while the crown leaves are insufficiently ripened, in fact almost green, and bring hardly enough money to pay for their handling. The temperature of the barn has to be raised to about 180° Fahrenheit in order to dry or cure the stalk sufficiently, and this temperature is at least 45° higher than sufficient to cure the leaves. Consequently the leaves are exposed to an injurious or somewhat prejudicial heat, and this I propose to obviate and at the same time effect a saving in fuel.

In my invention I cut from the stalks the leaves as they ripen or "yellow," and so am enabled to harvest all of the leaves of the plant without waste and secure a yield of great uniformity. The stalks I leave standing in the field to serve as fertilizer. This, however, is not new of itself.

In order to render such a mode of harvesting and curing tobacco practicable, I have devised a rack and stick of novel construction, as I will now proceed to set forth and claim.

In the accompanying drawings, in the several figures of which like parts are similarly designated, Figure 1 is a perspective view of enough of a barn supplied with my invention to illustrate the same. Fig. 2 is a top plan view of the rack on a larger scale, and Fig. 3 is a perspective view of the "stick."

The stick $a$ is of wood of suitable dimensions—say, three feet long by one inch by one and one-fourth inch—and is provided with about seven prongs, $b$, preferably of steel wire, driven through the stick, extending out each side of the same at right angles thereto and extending off from each side of said stick about four inches. These sticks are arranged in a rack, $c$, when in use for holding the leaves, said rack being a rectangular frame of wood having notches or sockets $d$ in opposite faces to receive the ends of the sticks and support them and their load.

In the barn I arrange a number of vertical stanchions, $e$, in pairs connected by cross-timbers $f$ and longitudinal timbers $g$, or otherwise secured and braced, and these stanchions are arranged to receive between them and support the racks, and I prefer to have the cross-heads of the racks to so engage the stanchions that the latter act to guide the racks when they are placed and moved in them. The cross-pieces $f$ are provided with pulleys $h$ to receive ropes $i$, having hooks $j$, which engage eyes $k$ on the racks to raise said racks into position in the barn, and when so raised the racks are retained by pins $l$, passed beneath them through holes in the stanchions. I may arrange these racks within the stanchions, one above the other, about eighteen inches apart, or the length of the leaves suspended therefrom. The ropes and pulleys are also useful in lowering the racks when the sticks are to be taken out. Six leaves of tobacco ("a hand") will be stuck one at a time through their butts on each wire on each side of the stick, so that each stick will hold fourteen hands of tobacco—a quantity never heretofore, so far as I am aware, possible of being placed upon one stick. Obviously, therefore, I can put more tobacco in a barn than by any of the modes heretofore proposed or practiced.

The operation is as follows: The leaves as they ripen are cut from the stalks and laid carefully and flat in an oblong basket. The baskets as filled are taken to the barn, and the sticks, having been taken from the racks, are supplied with the leaves by sticking their stem-butts on the wires, as described. The filled sticks are then placed in the rack till the rack is full, and then said rack is raised to the top of the stanchions and secured there. Another rack is similarly filled and placed in the stanchions, and so on. The unripe leaves are left on the stalks to ripen and are not cut till ripe, and by removing the ripe leaves the ripening of the others is hastened. After all the leaves are removed the stock is left standing in the field. A temperature of 135° Fahrenheit will be found amply sufficient to cure tobacco so harvested, and the color will be more uniform and the leaf in every way in much better condition than has been possible by the methods heretofore employed.

What I claim is—

1. The tobacco-stick $a$, having a series of prongs or points driven through it and projecting from its opposite sides at right angles to the same, combined with a supporting-rack adapted to receive it and permit its removal at pleasure, substantially as set forth.

2. A tobacco-stick rack composed of a rectangular frame having opposite notches or sockets in its longitudinal members to receive the sticks, and provided with means for facilitating its raising and lowering in position in a barn, substantially as described.

3. A tobacco-stick rack composed of a rectangular frame having opposite notches or sockets in its longitudinal members to receive the sticks, and provided with means for facilitating its raising and lowering in position in a barn, combined with stanchions adapted to receive said racks and pulleys and ropes to engage the racks, substantially as described.

4. The rectangular frame $c$, having its longitudinal timbers notched or socketed at opposite points, combined with the sticks $a$, having the wire prongs $b$, projecting at right angles from opposite sides of the stick, substantially as described.

In testimony whereof I have hereunto set my hand this 25th day of March, A. D. 1885.

WILLIAM HENRY SNOW.

Witnesses:
J. L. SNOW,
R. E. KENNEDY.